(12) United States Patent
Hawtin

(10) Patent No.: US 7,627,430 B2
(45) Date of Patent: Dec. 1, 2009

(54) METHOD AND SYSTEM FOR MANAGING INFORMATION

(75) Inventor: Steve Hawtin, Basingstoke (GB)

(73) Assignee: Schlumberger Technology Corporation, Houston, TX (US)

( * ) Notice: Subject to any disclaimer, the term of this patent is extended or adjusted under 35 U.S.C. 154(b) by 110 days.

(21) Appl. No.: 12/048,175

(22) Filed: Mar. 13, 2008

(65) Prior Publication Data

US 2008/0228830 A1 Sep. 18, 2008

Related U.S. Application Data

(60) Provisional application No. 60/906,617, filed on Mar. 13, 2007.

(51) Int. Cl.
*G06F 17/30* (2006.01)

(52) U.S. Cl. ............................... 702/11; 702/6; 702/12; 702/13; 175/45; 166/250.01; 166/250.15; 166/254.1; 166/372; 703/10; 705/28; 707/100; 707/200; 707/E17.005

(58) Field of Classification Search ...................... 702/6, 702/11, 12, 13, 188; 175/24, 40, 45, 61, 175/50, 73, 107; 166/53, 250.01, 250.15, 166/254.1, 372; 703/10; 705/28; 73/152.55; 714/E11.019; 707/100, 200, E17.005, 104.1, 707/3, E17.001, E17.014, E17.044
See application file for complete search history.

(56) References Cited

U.S. PATENT DOCUMENTS

| 5,139,094 | A | | 8/1992 | Prevedel et al. |
| 5,680,906 | A | | 10/1997 | Andrieux et al. |
| 5,899,958 | A | | 5/1999 | Dowell et al. |
| 5,992,519 | A | * | 11/1999 | Ramakrishnan et al. ...................... 166/250.15 |
| 6,266,619 | B1 | * | 7/2001 | Thomas et al. ................. 702/13 |
| 6,313,837 | B1 | | 11/2001 | Assa et al. |
| 6,980,940 | B1 | | 12/2005 | Gurpinar et al. |
| 7,003,439 | B2 | | 2/2006 | Aldred et al. |
| 7,079,952 | B2 | * | 7/2006 | Thomas et al. ................. 702/13 |

(Continued)

FOREIGN PATENT DOCUMENTS

GB 2392931 3/2004

(Continued)

OTHER PUBLICATIONS

International Search Report dated Jul. 25, 2008 (3 pages).

*Primary Examiner*—Carol S Tsai
(74) *Attorney, Agent, or Firm*—Robert P. Lord; Jim Patterson; Bryan P. Galloway

(57) ABSTRACT

A method for managing information associated with an oilfield operation of an oilfield, the oilfield having a subterranean formation with geological structures and reservoirs therein. The method includes specifying a first site of interest, where a first data source includes data stored at the first site of interest, designating a first abstract role for the first data source, where the first abstract role corresponds to one of a plurality of information lifecycle roles, designating a first abstract stream for the first data source, where the first abstract stream corresponds to one of a plurality of categories of information, and generating a first output associated with the first data source, where the first output includes the first site of interest, the first abstract role, and the first abstract stream. The method further includes presenting the first output, where the oilfield operation is adjusted based on the first output.

25 Claims, 10 Drawing Sheets

U.S. PATENT DOCUMENTS

| | | |
|---|---|---|
| 2003/0132934 A1 | 7/2003 | Fremming |
| 2003/0216897 A1 | 11/2003 | Endres et al. |
| 2004/0030501 A1 | 2/2004 | Denny et al. |
| 2004/0220846 A1 | 11/2004 | Cullick et al. |
| 2005/0038603 A1* | 2/2005 | Thomas et al. ................. 702/6 |
| 2005/0149307 A1 | 7/2005 | Gurpinar et al. |
| 2005/0209836 A1 | 9/2005 | Klumpen et al. |
| 2005/0209886 A1 | 9/2005 | Corkern |
| 2005/0211468 A1 | 9/2005 | Veeningen et al. |
| 2005/0228905 A1 | 10/2005 | Veeningen et al. |
| 2005/0236184 A1 | 10/2005 | Veeningen et al. |
| 2006/0047527 A1* | 3/2006 | Caveny et al. ................. 705/1 |
| 2006/0080064 A1 | 4/2006 | Denny et al. |
| 2006/0197759 A1 | 9/2006 | Fremming |
| 2006/0243047 A1* | 11/2006 | Terabayashi et al. ..... 73/152.55 |
| 2007/0107908 A1* | 5/2007 | Vaidya et al. ............... 166/376 |
| 2007/0112547 A1 | 5/2007 | Ghorayeb et al. |
| 2007/0198223 A1* | 8/2007 | Ella et al. .................... 702/188 |
| 2007/0271039 A1* | 11/2007 | Ella et al. ..................... 702/12 |
| 2008/0133550 A1* | 6/2008 | Orangi et al. ............... 707/100 |
| 2008/0208478 A1* | 8/2008 | Ella et al. ..................... 702/11 |
| 2008/0235280 A1* | 9/2008 | Schoen et al. ............ 707/104.1 |

FOREIGN PATENT DOCUMENTS

| | | |
|---|---|---|
| GB | 2411669 | 9/2005 |
| WO | 99/64896 A1 | 12/1999 |
| WO | 2004049216 | 6/2004 |

* cited by examiner

METHOD AND SYSTEM FOR MANAGING INFORMATION

CROSS-REFERENCE TO RELATED APPLICATIONS

This application claims priority, pursuant to 35 U.S.C. §119(e), to U.S. Patent Application Ser. No. 60/906,617, entitled "Method and System for Managing Information," filed on Mar. 13, 2007, which is herein incorporated by reference in its entirety.

BACKGROUND

Oilfield operations, such as surveying, drilling, wireline testing, completions and production, are typically performed to locate, gather, store and transport valuable downhole fluids. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

A formation is a distinctive and continuous body of rock that it can be mapped. Spaces between the rock grains ("porosity") of a formation may contain fluids such as oil, gas or water. Connections between the spaces ("permeability") may allow the fluids to move through the formation. Formations with sufficient porosity and permeability to store fluids and allow the fluids to move are known as reservoirs. A structure is a geological feature that is created by deformation of the Earth's crust, such as a fold or fault, a feature within the rock itself (such as a fracture) or, more generally, an arrangement of rocks. The above definitions are taken from Schlumberger's Oilfield Glossary (www.glossary.oilfield.slb.com), but in the industry, the terms formation and structure may be loosely used synonymously.

The complex operations of drilling and completing wells are well known by those of skill in the art and the description here is a simplified view. As shown in FIG. 1B-1D, one or more wellsites may be positioned to penetrate the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a planned path to access the reservoirs containing the valuable assets. Fluid, such as drilling mud or other drilling fluids, is pumped down the inside the drilling tools, and out of a drilling bit at the bottom of the drilling tools. The drilling bit is used to grind up the earth. After leaving the drilling bit, the drilling fluids flow between the outside of the drilling tools and the inside of the wellbore and back up to the surface. The drilling fluids bring the ground earth to the surface and hold back fluids from formations from prematurely entering the wellbore. During the drilling operation, the drilling tools may include components to perform downhole measurements to investigate the formations encountered. The drilling tools may be used to take samples of the formations, such as core samples. At various points in the drilling, the drilling is stopped and the drilling tools removed from the well. At such a point, as shown in FIG. 1C, after the drilling tools are removed, a wireline tool is deployed into the wellbore to perform additional downhole testing. Wireline tools may also be used to take samples of the formations or to sample the fluids in the formations. At such points, as is known in the art, after any desired wireline tools are run and removed, steel casing may be run into the well to depth and cemented into place to shore up the wellbore and to protect the formations through which the wellbore has passed. The drilling continues in the manner until the desired total depth is reached.

After the drilling operation is complete, the well may then be prepared for production. As shown in FIG. 1D, wellbore completions equipment is deployed into the wellbore to complete the well in preparation for the production of fluid therethrough. Fluid is allowed to flow from downhole reservoirs, into the wellbore and flows to the surface, generally through tubing and their completion equipment positioned in the wellbore. At the surface, the fluids flow through a wellhead and Christmas tree and into a production line. Production facilities are positioned at surface locations to collect the hydrocarbons from the wellsite(s) and to separate and direct fluids from the wells. Various equipment may be positioned about the oilfield to monitor oilfield parameters and/or to manipulate the oilfield operations, During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to formation structure and geological stratigraphy, which defines the geological structure of the subterranean formation. Dynamic data relates to fluids flowing through the geologic structures of the subterranean formation. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the density of the geological structure at different depths. This information may be used to generate basic structural maps of the subterranean formation. Other static measurements may be gathered using core sampling and well logging techniques. Core samples are used to take physical specimens of the formation at various depths as shown in FIG. 1B. Well logging involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface, preferably using production tubing as shown in FIG. 1D. As fluid passes to the surface, various dynamic measurements, such as fluid flow rates, pressure and composition may be monitored. These parameters may be used to determine various characteristics of the subterranean formation.

Sensors may be positioned throughout the oilfield to collect data relating to various oilfield operations. For example, sensors in the wellbore may monitor fluid composition, sensors located along the flow path may monitor flow rates and sensors at the processing facility may monitor fluids collected. Other sensors may be provided to monitor downhole, surface, equipment or other conditions. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other configurations. Often this information is used to determine where to drill new wells, how to re-complete or stimulate existing wells, or alter wellbore production.

Data from one or more wellbores may be analyzed to plan or predict various outcomes at a given wellbore. In some cases, the data from neighboring wellbores, wellbores into the same formations or wellbores with similar conditions or equipment is used to predict how a well will perform. There are usually a large number of variables and large quantifies of data to consider in analyzing wellbore operations. It is, therefore, often useful to model the behavior of the oilfield operation to determine the desired course of action. During the ongoing operations, the operating conditions may need adjustment as conditions change and new information is received.

Techniques have been developed to model the behavior of geological structures, downhole reservoirs, wellbores, surface facilities as well as other portions of the oilfield operation. Examples of modeling techniques are shown in Patent/Application/Publication Nos. U.S. Pat. No. 5,992,519, WO2004/049216, WO1999/064896, U.S. Pat. No. 6,313,837, US2003/0216897, US2003/0132934, US2005/0149307, and US2006/0197759. Typically, existing modeling techniques have been used to analyze only specific portions of the oilfield operation. More recently, attempts have been made to use more than one model in analyzing certain oilfield operations.

See, for example, Patent/Application/Publication Nos. U.S. Pat. No. 6,980,940, WO2004/049216, US2004/0220846, and US Ser. No. 10/586,283.

Techniques have also been developed to predict and/or plan certain oilfield operations, such as drilling operations. Examples of techniques for generating drilling plans are provided in Patent/Application/Publication Nos. US2005/0236184, US2005/0211468, US2005/0228905, US/2005/0209886, and US2005/0209836. Some drilling techniques involve controlling the drilling operation. Examples of such drilling techniques are shown in Patent/Application Nos. GB2392931 and GB2411669. Other drilling techniques seek to provide real-time drilling operations. Examples of techniques purporting to provide real time drilling are described in Patent/Application Nos. U.S. Pat. No. 7,079,952, U.S. Pat. No. 6,266,619, U.S. Pat. No. 5,899,958, U.S. Pat. No. 5,139,094, U.S. Pat. No. 7,003,439, and U.S. Pat. No. 5,680,906.

A company may amass a large amount of data in a variety of data sources when collecting data at a wellsite as described above. Thus, Information Lifecycle Management (ILM) has become a critical process for companies involved in the processing and storage of data related to oilfield operations. Information related to this data must be accessible and cataloged to allow for rapid processing of information and to reduce redundancy of information.

Typically, a company has a number of data sources they wish to manage. Additionally, the company may wish to track processes utilizing or affecting those data sources. On a smaller scale, these data sources and processes may be tracked in a simple list that is shared throughout the company. In such cases, technical personnel are able to be familiar with all the data sources and processes such that they can be consulted to locate a particular data source or process.

As the number of data sources and processes increase, a more formal method may be required to keep track of the information. A common way of tracking this information is to through the use of a searchable directory of all the data sources. In this scenario, each data source is associated with metadata, describing its contents and uses. For example, metadata for a data source could specify: the origin of the data in the data source, the attributes of the data source, when the metadata was last updated, and any processes that use the data source. A user can search the directory to find data sources meeting specific criteria. The metadata returned by a search may be used to facilitate information management.

Typically, directories of metadata are searchable based on key words and return a list of entries based on the search inputs. A user may then browse the results to see specific details about a particular data source. The directory may also provide groups based on classification of data contained in the data sources. These groups typically act as filters to view all data sources of a certain classification.

SUMMARY

In general, in one aspect, the invention relates to a method for managing information associated with an oilfield operation of an oilfield, the oilfield having a subterranean formation with geological structures and reservoirs therein. The method includes specifying a first site of interest, where a first data source includes data stored at the first site of interest, designating a first abstract role for the first data source, where the first abstract role corresponds to one of a plurality of information lifecycle roles, designating a first abstract stream for the first data source, where the first abstract stream corresponds to one of a plurality of categories of information, and generating a first output associated with the first data source, where the first output includes the first site of interest, the first abstract role, and the first abstract stream. The method further includes presenting the first output, where the oilfield operation is adjusted based on the first output.

In general, in one aspect, the invention relates to a system for managing information associated with an oilfield operation of an oilfield, the oilfield having subterranean formations with geological structures and reservoirs therein. The system includes an information management data source configured to store information associated with a first data source, where the first data source includes data stored at a first site of interest, and a hierarchical data provider configured to retrieve the information associated with the first data source from the information management data source. The system further includes an abstract role manager configured to designate at least one of a plurality of abstract roles to the data associated with the first data source, where each of the plurality of abstract roles corresponds to one of a plurality of information lifecycle roles, and an abstract stream manager configured to designate at least one of the plurality of abstract streams to the data associated with the first data source, where each of the plurality of abstract streams corresponds to one of a plurality of categories of information. The system further includes a data compiler and visualizer configured to generate a first output including data from the first data source associated with at least one of the plurality of abstract roles and at least one of the plurality of abstract streams and an interface configured to present the first output, where the oilfield operation is adjusted based on the first output.

In general, in one aspect, the invention relates to a system for managing information associated with an oilfield operation of an oilfield, the oilfield having a subterranean formation with geological structures and reservoirs therein. The system includes a first data source including data stored at a first site, where the first data source is associated with a first abstract role and a first abstract stream, a second data source including data stored at the first site, where the second data source is associated with the first abstract role and a second abstract stream, and a third data source including data stored at a second site, where the third data source is associated with a second abstract role and the first abstract stream. The system further includes an interface configured to enable a user to specify selection information, where the selection information includes at least one of the first abstract role, the second abstract role, the first abstract stream, and the second abstract stream, and present output describing data from the first data source, the second data source, and the third data source associated with the selection information, where the oilfield operation is adjusted based on the output.

In general, in one aspect, the invention relates to A computer readable medium including computer program code embodied therein for causing a computer system to manage information associated with an oilfield operation of an oilfield, the oilfield having a subterranean formation with geological structures and reservoirs therein. The computer program code includes program instructions to specify a first site of interest, where a first data source includes data stored at the first site of interest, designate a first abstract role for the first data source, where the first abstract role corresponds to one of a plurality of information lifecycle roles, designate a first abstract stream for the first data source, where the abstract stream corresponds to one of a plurality of categories of information, and generate a first output associated with the first data source, where the first output includes the first site of interest, the first abstract role, and the first abstract stream. The computer program code farther includes program instructions to present the first output, where the oilfield operation is adjusted based on the first output.

Other aspects of the invention will be apparent from the following description and the appended claims.

DETAILED DESCRIPTION

Figure 1:
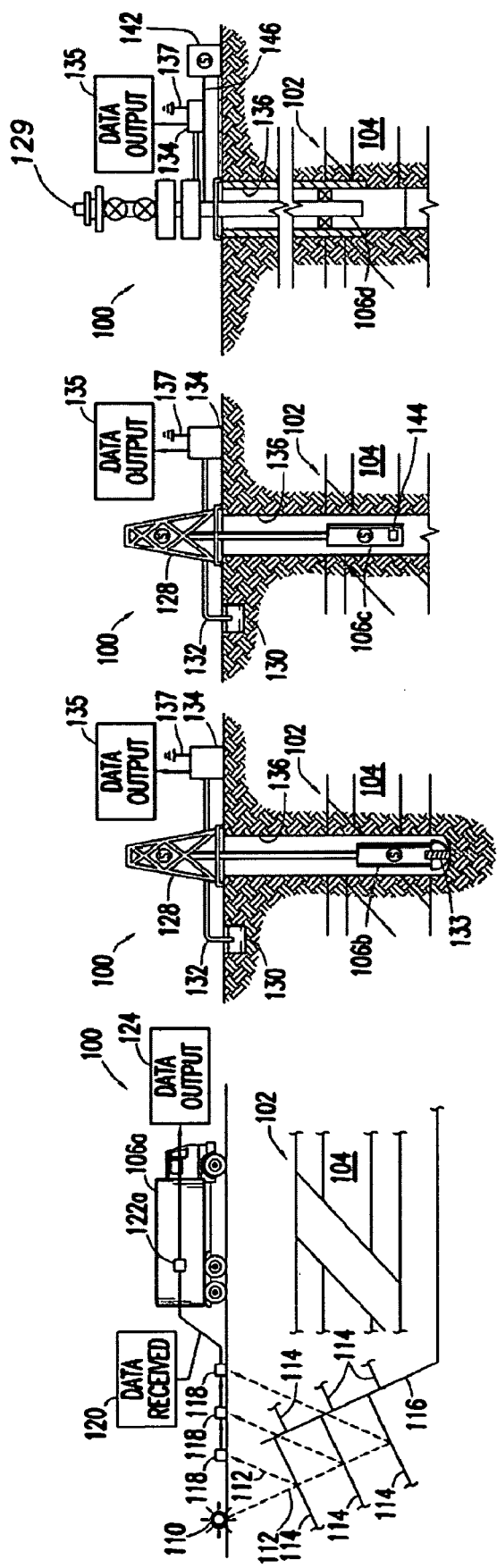
FIGS. 1A-1D depict a schematic view of an oilfield having subterranean formations containing geological structures and reservoirs therein, various oilfield operations being performed on the oilfield.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to providing a method and a system for managing information. More specifically, embodiments of the invention relate to associating information with a data source. Specifically, an abstract role and an abstract stream may be specified for a data source to facilitate information management. Embodiments of the invention also include functionality to specify workflows for data sources to describe how data flows between data sources.

The invention involves applications generated for the oil and gas industry. FIGS. 1A-1D depict an exemplary oilfield (100) with subterranean formations therein. More specifically, FIGS. 1A-1D depict schematic views of an oilfield (100) having subterranean formations (102) including a reservoir (104) therein and depicting various oilfield operations being performed on the oilfield (100). Various measurements of the subterranean formations (102) may be taken by different tools at the same location. These measurements may be used to generate information about the subterranean formations (102) and/or the reservoir(s) (104) and/or fluids contained therein.

FIG. 1A depicts a survey operation being performed by a seismic truck (106a) to measure properties of the subterranean formation. The survey operation is a seismic survey operation for producing sound vibrations. In FIG. 1A, an acoustic source (110) produces sound vibrations (112) that reflects off a plurality of horizons (114) in an earth formation (116). The sound vibration(s) (112) is (are) received by sensors, such as geophone-receivers (118), situated on the earth's surface. Upon receipt of the sound vibrations, the geophones (118) produce electrical output signals, referred to as data received (120) in FIG. 1A.

The received sound vibration(s) (112) are representative of different parameters (such as amplitude and/or frequency). The data received (120) is provided as input data to a computer (122a) within the seismic recording truck (106a), and responsive to the input data, the recording truck computer (122a) generates a seismic data output record (124). The seismic data (within the seismic data output record (124)) may be further processed as desired, for example by data reduction.

FIG. 1B depicts a drilling operation being performed by a drilling tool (106b) suspended by a rig (128) and advanced into the subterranean formation (102) to form a wellbore (136). A mud pit (130) is used to draw drilling mud into the drilling tool (106b) via flow line (132) for circulating drilling mud through the drilling tool (106b) and back to the surface. The drilling tool (106b) is advanced into the formation to reach one or more reservoirs (104). The drilling tool (106b) is preferably adapted for measuring downhole properties. The logging while drilling tool may also be adapted for taking a core sample (133) as shown, or removed so that a core sample may be taken using another tool.

A surface unit (134) is used to communicate with the drilling tool and offsite operations. The surface unit (134) is capable of communicating with the drilling tool to send commands to drive the drilling tool, and to receive data therefrom. The surface unit (134) is preferably provided with computer facilities for receiving, storing, processing and analyzing data from the oilfield (100). The surface unit (134) collects data output (135) generated during the drilling operation.

Computer facilities, such as those of the surface unit (134), may be positioned at various locations about the oilfield (100) and/or at remote locations.

Sensors (S), such as gauges, may be positioned throughout the reservoir, rig, oilfield equipment (such as the downhole tool) or other portions of the oilfield (100) for gathering information about various parameters, such as surface parameters, downhole parameters and/or operating conditions. These sensors (S) preferably measure oilfield parameters, such as weight on bit, torque on bit, pressures, temperatures, flow rates, compositions, measured depth, azimuth, inclination and other parameters of the oilfield operation.

The information gathered by the sensors may be collected by the surface unit (134) and/or other data collection sources for analysis or other processing. The data collected by the sensors (S) may be used alone or in combination with other data. The data may be collected in a database and all or select portions of the data may be selectively used for analyzing and/or predicting oilfield operations of the current and/or other wellbores.

Data outputs from the various sensors positioned about the oilfield (100) may be processed for use. The data may be may be historical data, real time data or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical and/or reservoir engineering simulations. The reservoir, wellbore, surface and/or process data may be used to perform reservoir, wellbore, or other production simulations. The data outputs from the oilfield operation may be generated directly from the sensors, or after some preprocessing or modeling. These data outputs may act as inputs for further analysis.

The data is collected and may be stored at the surface unit (134). One or more surface units may be located at the oilfield (110), or coupled remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions of the oilfield (100) and/or other locations, such as a remote office. The surface unit (134) may also be provided with or functionally linked and/or coupled to a controller for actuating mechanisms at the oilfield (100). The surface unit (134) may then send command signals to the oilfield (100) in response to data received. The surface unit (134) may receive commands via the transceiver or may itself execute commands to the controller. A processor (not shown) may be provided to analyze the data (locally or remotely) and make the decisions to actuate the controller. In this manner, the oilfield (100) may be selectively adjusted based on the data collected. These adjustments may be made automatically based on computer protocol, or manually by an operator. In some cases, well plans and/or well placement and/or well equipment (subsurface or production equipment) may be adjusted to select optimum operating conditions, or to avoid problems.

FIG. 1C depicts a wireline operation being performed by a wireline tool (106*c*) suspended by the rig (128) and into the wellbore (136) of FIG. 1B. The wireline tool (106*c*) is preferably adapted for deployment into a wellbore for performing well logs, performing downhole tests and/or collecting samples. The wireline tool (106*c*) of FIG. 1C may have, for example, a nuclear, explosive or acoustic energy source (144) that provides signals to the surrounding subterranean formations (102) and receives signals indicative of properties of the subterranean formations or the fluids contained in reservoirs.

The wireline tool (106*c*) may provide data to a surface unit (134) of FIG. 1C. As shown data output (135) is generated by the wireline tool (106*c*) and collected at the surface. The wireline tool (106*c*) may be positioned at various depths in the wellbore (136) to provide a survey of the subterranean formation (102).

FIG. 1D depicts a production operation being performed by a production tool (106*d*) deployed from a production unit or Christmas tree (129) and into the completed wellbore (136) of FIG. 1C for drawing fluid from the downhole reservoirs into surface facilities (142). Fluid flows from reservoir (104) through perforations in the casing (not shown) and into the production tool (106*d*) in the wellbore (136) and to the surface facilities (142) via a gathering network (146).

Sensors (S), such as gauges, positioned about the oilfield are operatively connected to a surface unit (142) for collecting data therefrom. During the production process, data output (135) may be collected from various sensors and passed to the surface unit and/or processing facilities. As shown, the sensor (S) may be positioned in the production tool (106*d*) or associated equipment, such as the Christmas tree (129), gathering network (146), surface facilities (142) and/or the production facility, to measure fluid parameters, such as fluid composition, flow rates, pressures, temperatures, and/or other parameters of the production operation.

While only one wellsite is shown, it will be appreciated that the oilfield (100) may cover a portion of land that hosts one or more wellsites. One or more gathering facilities may be operatively connected to one or more of the wellsites for selectively collecting downhole fluids from the wellsite(s).

Throughout the oilfield operations depicted in FIGS. 1A-D, there are numerous business considerations. For example, the equipment used in each of these figures has various costs and/or risks associated therewith. At least some of the data collected at the oilfield (100) relates to business considerations, such as value and risk. This business data may include, for example, production costs, rig time, storage fees, price of oil/gas, weather considerations, political stability, tax rates, equipment availability, geological environment and other factors that affect the cost of performing the oilfield operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation and other factors that will affect the costs and risks associated with the oilfield operation.

While FIGS. 1B-1D depicts monitoring tools used to measure properties of an oilfield (100), it will be appreciated that the tools may be used in connection with non-oilfield operations, such as mines, aquifers or other subterranean facilities. Also, while certain data acquisition tools are depicted, it will be appreciated that various measurement tools capable of sensing properties, such as seismic two-way travel time, density, resistivity, production rate, etc., of the subterranean formation and/or its geological structures may be used. Various sensors (S) may be located at various positions along the subterranean formation and/or the monitoring tools to collect and/or monitor the desired data. Other sources of data may also be provided from offsite locations.

The oilfield configuration of FIGS. 1A-1D is intended to provide a brief description of an example of an oilfield usable with the present invention. Part, or all, of the oilfield (100) may be on land and/or sea. Also, while a single oilfield measured at a single location is depicted, the present invention may be utilized with any combination of one or more oilfields, one or more processing facilities and one or more wellsites.

In one or more embodiments of the invention, an information management system (IMS) is used to manage information characterizing data from one or more operations discussed in FIGS. 1A-1D.

Figure 2:
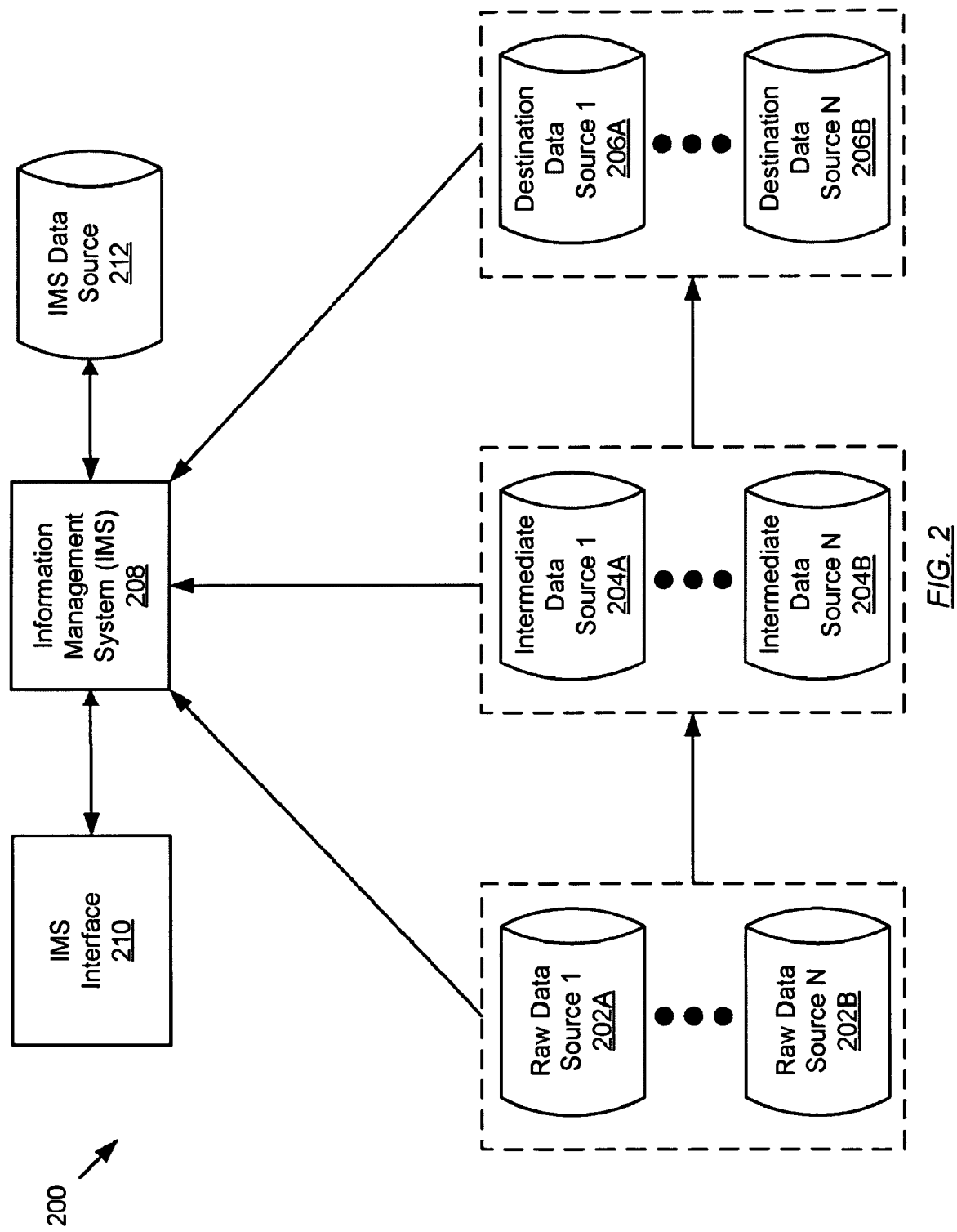
FIG. 2 depicts the interactions between data sources and a system for managing information in accordance with one or more embodiments of the invention.

FIG. 2 shows the interactions between data sources and a system for managing information characterizing the data sources in accordance with one or more embodiments of the invention. The system includes an information management system (IMS) (208) interacting with data sources. In one or more embodiments of the invention, the IMS (208) may be configured to manage information associated with raw data sources (202A, 202N), intermediate data sources (204A, 202N), and/or destination data sources (206A, 202N). In one or more embodiments of the invention, the IMS (208) interacts with an IMS interface (210) and an IMS data source (212). Each of the aforementioned components of FIG. 2 is described below.

In one or more embodiments of the invention, each raw data source (202A, 202N) may be any data source configured to store raw data. Specifically, the raw data may be collected by an instrument with a sensor capable of measuring physical aspects of an environment, as described with respect to FIGS. 1A-1D. For example, a raw data source 1 (202A) may store data from a thermometer, a wellbore sensor, a pH meter, or some other device capable of collecting raw data. Those skilled in the art will appreciate that the raw data source 1 (202A) may store its information in a variety of data repositories (e.g., a database format (DBF) file, a flat file, a database, or some other data repository).

In one or more embodiments of the invention, each intermediate data source (204A, 204N) may be any interim data source configured to store interim data, where the interim data is previously stored in a separate data source. Specifically, interim data may include data from raw data sources as well as data from other sources (e.g., data entry, data processing, or some other source of data). In other words, interim data may correspond to data being processed before the interim data may be used in a destination data source (206). Examples of processing interim data include, but are not limited to, data cleaning, data linking, or data approval. In one example, the intermediate data source 1 (204A) may be configured to store temperature data from the raw data source 1 (202A) and relate that data to a weather forecast record, the combination of which may later be stored in a destination data source 1 (206A). Alternatively, the weather forecast record may later be stored in another intermediate data source N (204N).

In one or more embodiments of the invention, each destination data source (206A, 206N) may be any data source configured to store destination data, where destination data includes interim data. Specifically, destination data may correspond to data used in oilfield operations or some other type of operation. In other words, destination data may correspond to data that has been processed as interim data and is ready for use in actual operations. For example, destination data may be data used by computer applications, by business processes, for data mining, or by some other process or system. Those skilled in the art will appreciate that the destination data sources (206A, 206N) may also be configured to store data from other sources (e.g., data entry, data processing, or some other source of data).

Further, the raw data sources (202A, 202N), the intermediate data sources (204A, 204N), and the destination data sources (206A, 204N) may be re-designated. For example, a destination data source N (206N) may be re-designated as an intermediate data source N (204N). In one or more embodiments of the invention, a data source may be re-designated when any portion of the data included in the data source is re-designated. For example, destination data may be re-designated as interim data when an oilfield operation is altered, requiring additional data processing of the destination data.

In one or more embodiments of the invention, the information characterizing the raw data sources (202A, 202N), the intermediate data sources (204A, 202N), and/or the destination data sources (206) may be entered using the IMS Interface (210). Alternatively, the information characterizing the raw data sources (202), the intermediate data sources (204), and/or the destination data sources (206) may be sent to the IMS (208) using automated methods (e.g., crontab file (cron job), scheduled task, database script, or some other automated method).

Figure 3:
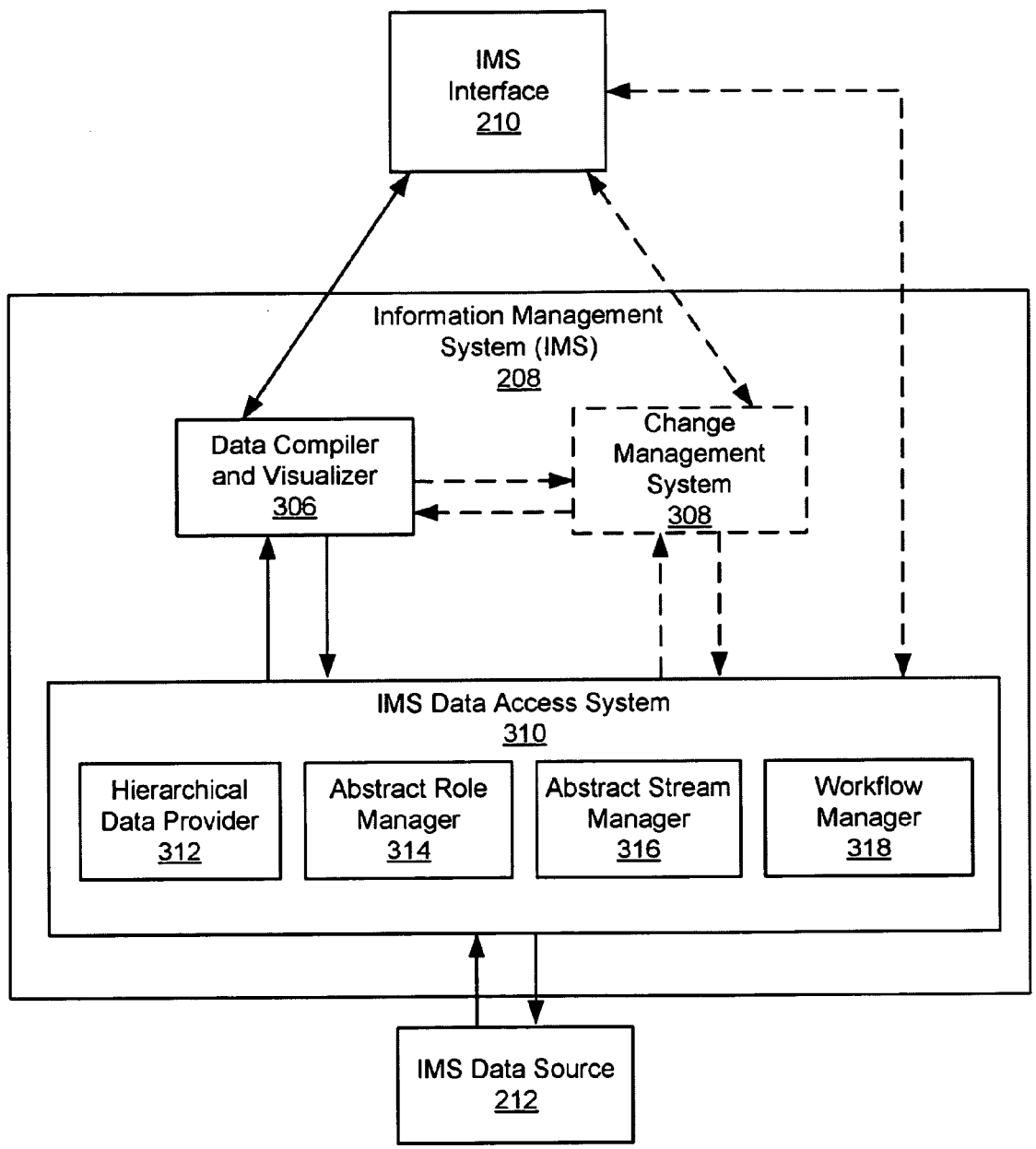
FIG. 3 depicts a system for managing information in accordance with one or more embodiments of the invention.

In one or more embodiments of the invention, the IMS interface (210) is configured to present output from the IMS (208). Specific components of the IMS (208) are depicted in FIG. 3 described below. Those skilled in the art will appreciate that the output from the IMS (208) may be presented at the IMS interface (210) in a variety of formats (e.g., tabular with text, tabular with graphics, list, three dimensional, or some other form of output). In one or more embodiments of the invention, the IMS interface (210) may also be configured to receive commands for the IMS (208) from a user.

In one or more embodiments of the invention, the IMS (208) may be further configu red to store data in the IMS data source (212). Specifically, information characterizing the raw data sources (202A, 202N), the intermediate data sources (204A, 204N), and/or the destination data sources (206A, 206N) may be stored in the IMS data source (212). Those skilled in the art will appreciate that the IMS data source (212) may be any type of data repository (e.g., a database, an extensible markup language (xml) file, a database format (dbf) file, or some other data repository).

FIG. 3 depicts a system for managing information in accordance with one or more embodiments of the invention. The system architecture includes an IMS interface (210) further including a data compiler and visualizer (306) and an IMS data access system (310). Optionally, the IMS (210) may further include a change management system (308). In one or more embodiments of the invention, the IMS interface (210) interacts with the data compiler and visualizer (306). Optionally, the IMS interface (210) may also interact with IMS data access system (310). The IMS data access system (310) interacts with an IMS data source (212). In one or more embodiments of the invention, the IMS data access system (310) further includes a hierarchical data provider (312), an abstract role manager (314), an abstract stream manager (316), and a workflow manager (318). Each of the aforementioned components of FIG. 3 is described below.

In one or more embodiments of the invention, the data compiler and visualizer (306) is configured to generate output. In one or more embodiments of the invention, the IMS interface (210) is configured to present the generated output. Specifically, the data compiler and visualizer (306) may collect information characterizing multiple data sources and prepare the information for presentation at the IMS interface (210). Alternatively, the data compiler and visualizer (306) may be further configured to store the generated output, generate an output file using the generated output, or transmit the generated output.

Optionally, a change management system (308) may interact with the data compiler and visualizer (306) and the IMS interface (210). In one or more embodiments of the invention, the change management system (308) may be configured to provide change management functionality (e.g., versioning, history, check-in, check-out, version comparison, or some other change management function).

In one or more embodiments of the invention, the change management system (308) may be configured to track any modifications made to the IMS data source (212). For example, the change management system (308) may request the name of a user be stored when the user enters information characterizing a new data source. Further, the change management system (308) may request the name of the user be stored when the user modifies the information associated with the new data source.

In one or more embodiments of the invention, the change management system (308) may be configured to provide an approval process for modifications made to the IMS data source (212). For example, the change management system (308) may allow modifications made by a user to be reviewed by a supervisor before they are approved. In another example, the change management system (308) may allow modifications by a user to be assessed and commented on by another user. In this case, the assessments and comments of the other user may be considered in the review process of a supervisor.

As shown in FIG. 3, the data compiler and visualizer (306) and the change management system (308), when the change management system is present, may interact with the IMS data access system (310). In one or more embodiments of the invention, the IMS data access system (310) is configured to provide an interface to the IMS data source (212). Accordingly, the IMS data source (212) may be configured to store data associated with data sources (e.g., raw data sources (202), intermediate data sources (204), and/or destination data sources (206)). Specifically, the IMS data access system (310) includes the hierarchical data provider (312), which may be configured to retrieve data from the IMS data source (212). In one or more embodiments of the invention, the hierarchical data provider (312) may specify the hierarchical relationships of data retrieved from the IMS data source (212). For example, the hierarchical data provider (312) may use the abstract stream manager (316) to specify hierarchical relations for data sources based on designated abstract streams.

In one or more embodiments of the invention, an abstract stream (i.e., data stream) corresponds to a category of information. The category of information may specify the type of data that is stored in the data source. For example, categories of information may include, but are not limited to: spatial, seismic, wells, logs, drilling, production, unstructured, and field. Further, a category of information may include sub-categories, where the category and the sub-categories are organized in a hierarchical manner. For example, a well category may be associated with two sub-categories, a well-header category and a well-directional category. In this example, the categories and sub-categories may be related such that the well category is a parent node of the well-header category and well-directional category.

Continuing with the discussion of FIG. 3, in one or more embodiments of the invention, as discussed above, the IMS data access system (310) includes the abstract stream manager (316), which may be configured to designate abstract streams for data sources. Those skilled in the art will appreciate that multiple abstract streams may be designated for a single data source. The abstract stream manager (316) may also be configured to compare data sources from multiple sites based on an abstract stream of interest.

In one embodiments of the invention, the IMS data access system (310) includes the abstract role manager (314), which may be configured to designate abstract roles for data sources. Those skilled in the art will appreciate that multiple abstract roles may be designated for a single data source. The abstract role manager (314) may also be configured to compare data sources from multiple sites based on an abstract role of interest. In one or more embodiments of the invention, an abstract role corresponds to an information lifecycle role used for information lifecycle management. In one or more embodiments of the invention, the information lifecycle role may specify a role fulfilled by the data source in managing the information of a company. For example, information lifecycle roles may include, but are not limited to: external feed, original, working, master, project, target, or some other information lifecycle role.

In one or more embodiments of the invention, the categories of information and information lifecycle roles may be restricted to a pre-defined list of categories of information and information lifecycle roles. Alternatively, the categories of information and information lifecycle roles may be defined by a user for a particular set of data sources. Further, the categories of information and information lifecycle roles may be updated dynamically by the user.

Continuing with the discussion of FIG. 3, in one or more embodiments of the invention, the IMS data access system (310) includes the workflow manager (318), which may be configured to designate workflows for data sources. In one or more embodiments of the invention, a workflow may describe how data is moved between abstract roles. For example, a workflow may describe how data moves from a first data source designated with an external feed abstract role to a second data source designated with an original abstract role.

In one or more embodiments of the invention, the IMS data access system (310) may be configured to define a reference site. More specifically, the IMS data system (310) may be configured to define abstract streams, abstract roles, and workflows for a reference site as described above. In this case, the reference site describes the ideal flow of information through data sources. In one or more embodiments of the invention, the IMS data access system (310) is configured to compare the reference site to the designated abstract streams, abstract roles, and workflows of a specified site. More specifically, the IMS data access system is configured to identify differences between the ideal flow of information of the reference site and the flow of information at the specified site.

Figure 4:
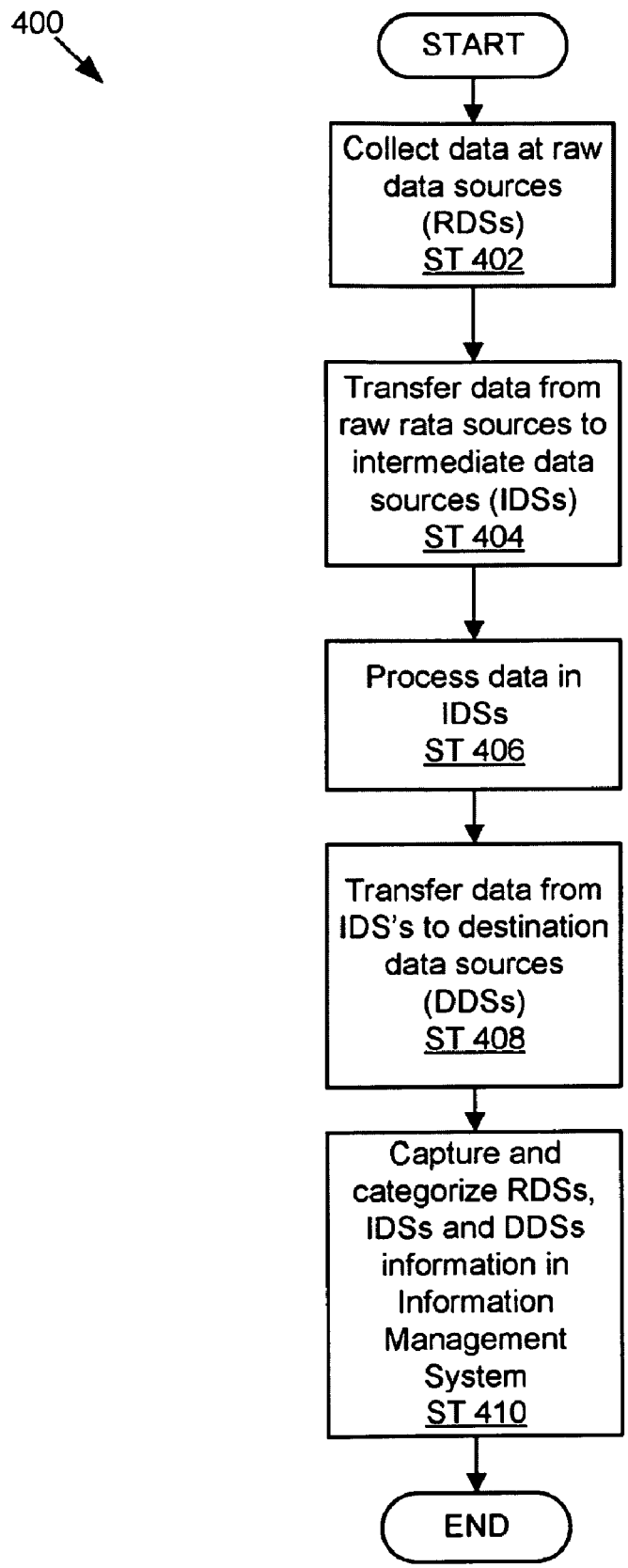
FIGS. 4-7 depict flow charts for managing information in accordance with one or more embodiments of the invention.

FIG. 4 depicts a flow chart for managing information in accordance with one or more embodiments of the invention. Specifically, FIG. 4 shows a flow chart for collecting information associated with data sources (e.g., raw data sources, intermediate data sources, and/or destination data sources). In one or more embodiments of the invention, one or more of the steps described below may be omitted, repeated, and/or performed in a different order. Accordingly, the specific arrangement of steps shown in FIG. 4 should not be construed as limiting the scope of the invention.

Initially, data is collected at raw data sources (RDSS) (Step 402). As mentioned above, RDSs may be configured to store raw data. In one or more embodiments of the invention, the raw data may be collected at sensors, as described with respect to FIGS. 1A-1D, and stored in the raw data source(s). Alternatively, the raw data may be collected by a user, using an instrument including a sensor, and then stored in the raw data source. For example, a user may collect seismic data using a seismograph and then store the seismic data in a raw data source.

Data is transferred from the RDSs to intermediate data sources (IDSs) (Step 404). As mentioned above, IDSs may be configured to store interim data. Further, IDSs may also be configured to store data from sources other than the RDSs. For example, an interim data source may be configured to store data from another interim data source, data entered by a user, or data from some other data source not classified as a raw data source.

Data in the IDSs is processed (Step 406). For example, data in the IDSs may be joined, transformed, aggregated, updated, sorted, indexed, inserted, deleted, or processed using other data processing techniques. Those skilled in the art will appreciate that the data processing may be performed by a user or may be performed by an automated method (e.g., crontab file (cron job), scheduled task, database script, or some other automated method).

The processed data from Step 406 is transferred from the IDSs to the destination data sources (DDSs) (Step 408). As mentioned above, DDSs are configured to store destination data, where destination data includes interim data. Further, DDSs may also be configured to store data from sources other than the IDSs. For example, a destination data source may be configured to store data from another destination data source, data entered by a user, or data from some other data source not classified as an intermediate data source.

Next, information associated with the RDSs, IDSs, and/or DDSs captured and categorized in an IMS (Step 410). Those skilled in the art will appreciate that information associated with the data sources may be captured and categorized from any combination or subset of the RDSs, IDSs, and DDSs. For example, information associated with data sources may be categorized from a subset of the RDS's and all of the IDSs.

Those skilled in the art will appreciate that each RDSs, IDSs, and DDSs may be configured to store data from multiple data sources. For example, a destination data source may be configured to store data from three separate intermediate data sources. Further, those skilled in the art will appreciate that FIG. 4 may depict a continuous process. For example, Step 410 may be performed on a regular scheduled based on modifications to the RDSs, IDSs, and DDSs.

Figure 5:
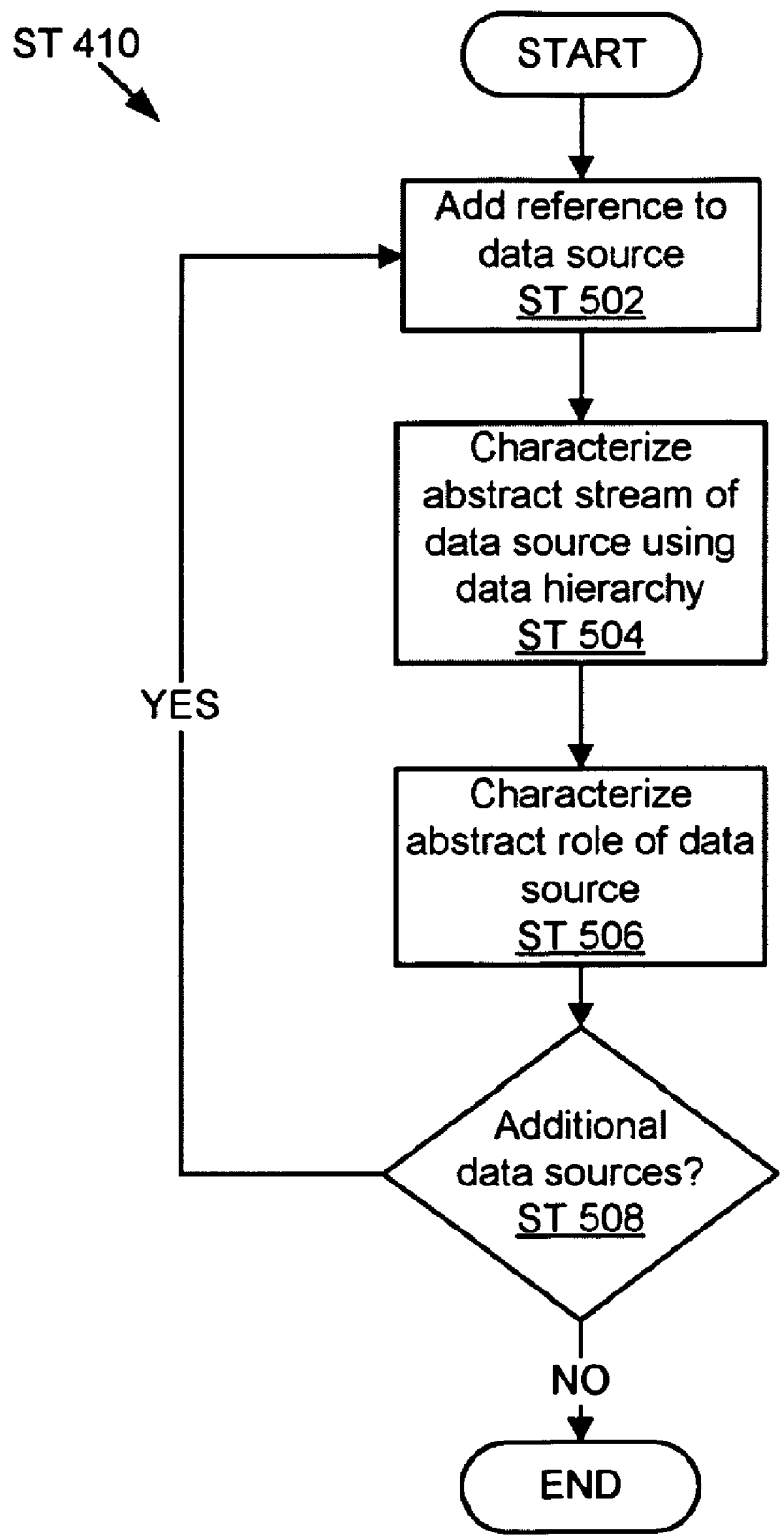

FIG. 5 depicts a flow chart for managing information in accordance with one or more embodiments of the invention. Specifically, FIG. 5 shows a flow chart for collecting information associated with data sources. In one or more embodiments of the invention, one or more of the steps described below may be omitted, repeated, and/or performed in a different order. Accordingly, the specific arrangement of steps shown in FIG. 5 should not be construed as limiting the scope of the invention.

Initially, a reference to a data source is stored (Step 502). Optionally, metadata associated with the data source may also be stored. Those skilled in the art will appreciate that metadata may include a variety of information associated with the data source (e.g., site/location, administrator, last update date, date of inception, schema information, data format, or some other information associated with the data source). Simultaneous or subsequent to the storing of the reference to the data source, the data source is characterized with an abstract stream using a data hierarchy (Step 504). Those skilled in the art will appreciate that the data source may be characterized with multiple abstract streams. In one or more embodiments of the invention, the data hierarchy may define a hierarchical relationship between different abstract streams as described with respect to FIG. 3. Alternatively, the abstracts streams of the data source may be characterized without the use of the data hierarchy. Specifically, the data source may be characterized with abstract stream(s) without specifying hierarchical relationships for the abstract stream(s).

In one or more embodiments of the invention, the data hierarchy may be pre-configured in the IMS. Alternatively, the data hierarchy may be defined by a user or process for a particular set of data sources. For example, the data hierarchy may be defined while performing Step 504.

Continuing with the discussion of FIG. 5, simultaneous or subsequent to the storing of the reference to the data source, the data source is characterized with an abstract role (Step 506). Those skilled in the art will appreciate that the data source may be characterized with multiple abstract roles. At this stage, a determination is made as to whether there are additional data sources to process (Step 508). If there are additional data sources, then Steps 502-506 are repeated. If there are no additional data sources, then the process ends.

In one or more embodiments of the invention, the steps of FIG. 5 may be performed by a user entering data into an IMS interface.

Alternatively, the steps of FIG. 5 may be performed by an automated process. Alternatively, the steps of FIG. 5 may be performed by a combination of a user entering data and an automated process. Further, the steps of FIG. 5 may be performed on any combination or subset of the RDSs, IDSs, and DDSs.

Figure 6:
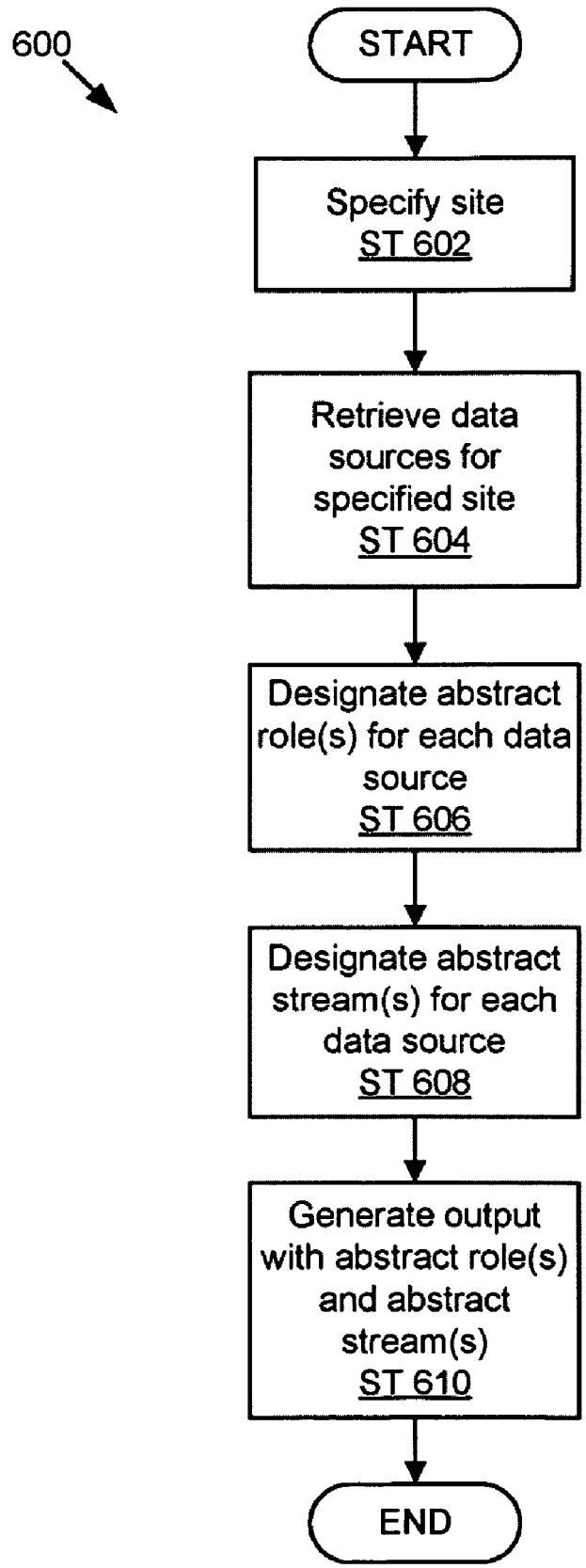

FIG. 6 depicts a flow chart for managing information in accordance with one or more embodiments of the invention. Specifically, FIG. 6 shows a flow chart for generating output describing data sources. In one or more embodiments of the invention, one or more of the steps described below may be omitted, repeated, and/or performed in a different order. Accordingly, the specific arrangement of steps shown in FIG. 6 should not be construed as limiting the scope of the invention.

Initially, a site is specified (Step 602). Those skilled in the art will appreciate that the site may correspond to a physical location, an asset team, a business unit, or some other designation for a combination or subset of the RDSs, IDSs, and/or DDSs. Next, information associated with the data sources for the specified site is retrieved (Step 604). Those skilled in the art will appreciate that each data source may be in a variety of data source formats (e.g., database format (dbf) file, relational database, flat-file, or some other type of data source). Optionally, the information associated with the data sources may include metadata associated with each data source.

Subsequent or simultaneous to the retrieval of information in Step 604, an abstract role is designated for each data source (Step 606). Those skilled in the art will appreciate that multiple abstract roles may be designated for each data source. Subsequent or simultaneous to the retrieval of information in Step 604, an abstract stream is designated for each data source (Step 608). Those skilled in the art will appreciate that multiple abstract streams may be designated for each data source.

Next, output is generated using the information associated with the data sources (Step 610). Those skilled in the art will appreciate that the output may include a variety of information associated with data sources (e.g., abstract stream(s), abstract role(s), metadata, workflow information, or other information associated with the data sources). Further, those skilled in the art will appreciate that the output may be filtered based on a variety of attributes (e.g., abstract roles, groups of abstract roles, abstract streams, groups of abstract streams, date, creator of data source, or some other attribute). In one or more embodiments of the invention, the generated output may be stored in an IMS data source. Alternatively, the generated output may be presented using an IMS interface.

In one or more embodiments of the invention, the generated output is used to adjust the flow of information at the site. For example, the output may be used to analyze the flow of information to identify an obsolete data source. In this example, an oilfield operation at the site may be adjusted to exclude the obsolete data source. In another example, the output may be used to analyze the flow of information to generate an optimized workflow for the data sources (e.g., decreasing the number of data sources included in the workflow). In this example, an oilfield operation of the site may be adjusted to facilitate the optimized workflow.

Those skilled in the art will appreciate that the generated output may be presented in a variety of formats (e.g., tabular with text, tabular with graphics, list, etc.). For example, the output may be presented as a table showing the abstract role(s) and abstract stream(s) for each data source as text. Alternatively, the output may be presented as a table representing each data source as a graphic, where the graphic designates which abstract role(s) and abstract stream(s) are designated for the data source.

Figure 7:
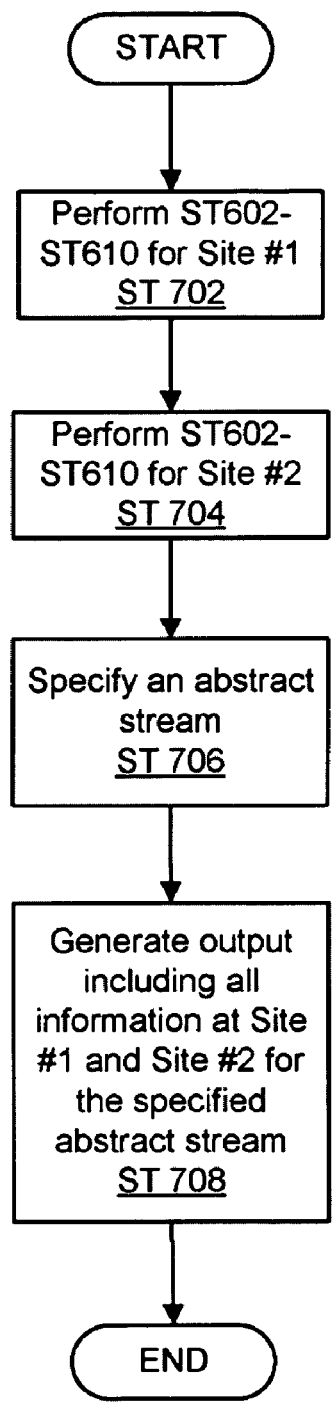

FIG. 7 depicts a flow chart for managing information in accordance with one or more embodiments of the invention. Specifically, FIG. 7 shows a flow chart for generating output describing data sources at multiple sites. In one or more embodiments of the invention, one or more of the steps described below may be omitted, repeated, and/or performed in a different order. Accordingly, the specific arrangement of steps shown in FIG. 7 should not be construed as limiting the scope of the invention.

Initially, the steps of FIG. 6 are performed for a first site (Step 702). Next, the steps of FIG. 6 are performed for a second site (Step 704). Those skilled in the art will appreciate that the steps of FIG. 6 may be performed for any number of sites. Further, in one or more embodiments of the invention, the steps of FIG. 6 may be applied to a specific set of sites by filtering the sites based on their data sources. For example, the data sources may be filtered by abstract role(s), abstract stream(s), date last modified, geographical region, or some other attribute of the data source. Those skilled in the art will appreciate that the steps of FIG. 6 could be further repeated for any number of sites.

In one or more embodiments of the invention, an abstract stream of interest is specified (Step 706). In one or more embodiments of the invention, the abstract stream of interest may be designated for data sources at the first site and the second site. Alternatively, the abstract stream may be designated for data source(s) at the first site, the second site, or neither.

At this stage, output is generated including the information associated with the first site for the abstract stream of interest and the information associated with the second site for the abstract stream of interest (Step 708). For example, the output may include information associated with data sources at the first site designated with the abstract stream of interest, the abstract roles designated for the data sources at the first site, information associated with the data sources at the second site designated with the abstract stream of interest, and the abstract roles designated for the data sources at the second site.

In another example, at Step 706 an abstract role of interest may be specified for data sources at the first site and the second site. In this case, at Step 708 the abstract streams associated with the first site and the second site may be obtained for the data sources associated with the abstract role of interest and used to generate the output.

In one or more embodiments of the invention, the output generated in Step 708 may be used to identify differences between the flow of information at the first site and the second site. For example, if the abstract stream of interest is well data, the output may be used to compare the differences between the abstract roles at the first site and the second site. In other words, the output may be used to identify abstract roles at the second site that are not specified at the first site for well data. In the case that the first site is a reference site as discussed with respect to FIG. 3, the output may be used to identify differences between the ideal flow of information of the reference site and the current flow of information at the second site.

In one or more embodiments of the invention, the flow of information at the second site may be adjusted based on the identified differences. For example, the second site may be adjusted to use a data source of an abstract role specified for the first site. In other words, an oilfield operation of the second site may be adjusted to include abstract roles specified for the first site (e.g., modifying the oilfield operation at the second site to collect data from a raw data source used at the first site). Those skilled in the art will appreciate that the abstract streams of the second site may be similarly adjusted when an abstract role of interest is specified in Step 706.

Those skilled in the art will appreciate that the generated output may be presented in a variety of formats (e.g., tabular with text, tabular with graphics, list, three dimensional, or some other form of output). For example, the output may be presented as a table showing the abstract stream(s) and data source(s) for each site as text. Alternatively, the output may be presented as a table representing each data source as a graphic, where the graphic designates which site(s) and abstract role(s) are associated with each data source. Alternatively, the output may be presented as a three-dimensional table representing each data source as a three-dimensional shape, where the three-dimensional shape designates which site(s), abstract role(s), and abstract stream(s) are associated with each data source.

Those skilled in the art will appreciate that Steps 702-706 may be performed simultaneously. For example, a query may be performed on multiple database tables to join and filter all the necessary information.

Figure 8:
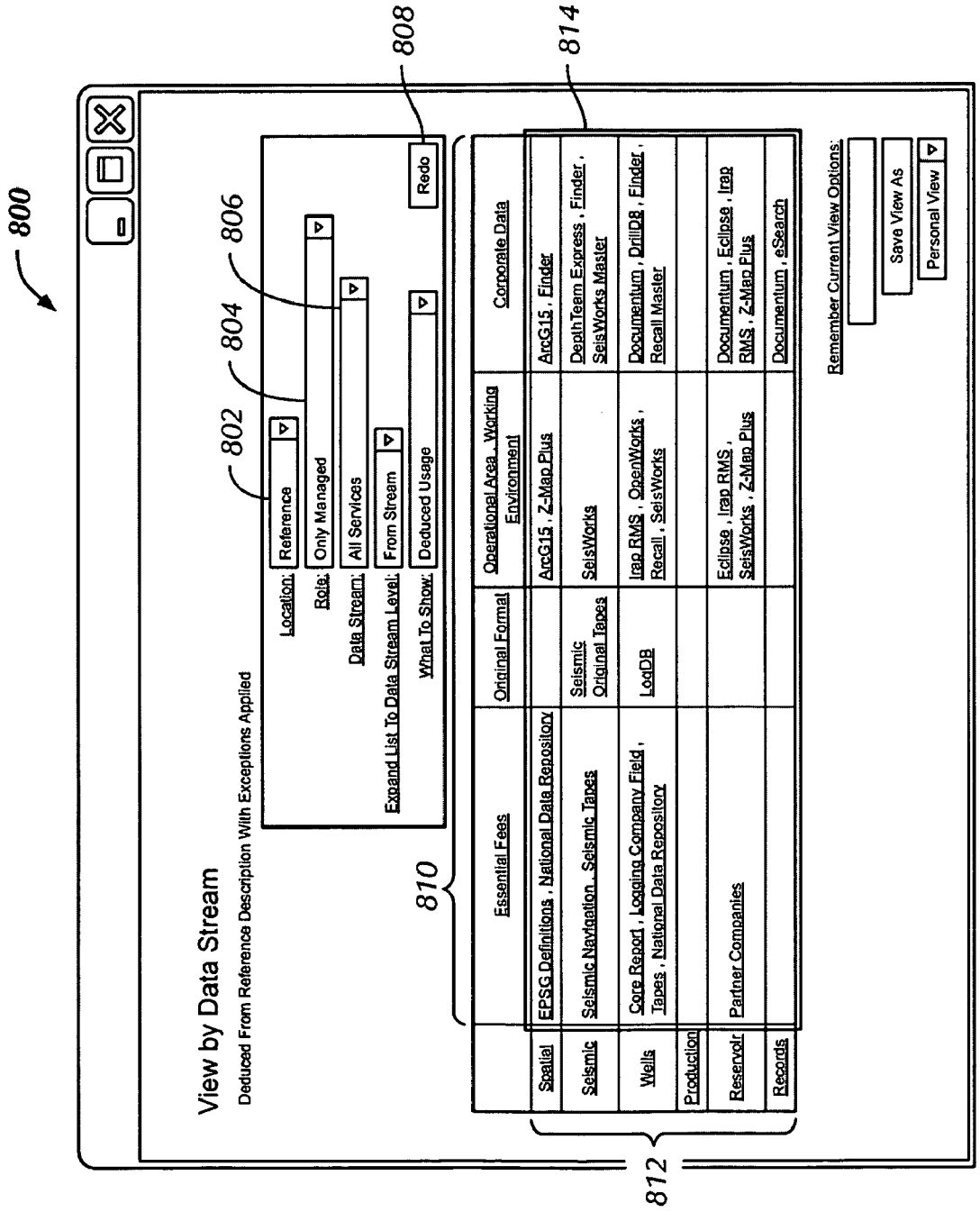
FIGS. 8 and 9 depict a graphical user interface (GUI) in accordance with one embodiment of the invention.

FIG. 8 depicts a graphical user interface (GUI) in accordance with one embodiment of the intention. The following is an example of the process described in FIG. 6 above using FIG. 8. The example should not be construed to limit the scope of the invention.

Consider the scenario in which information associated with data sources has been collected at a number of sites, and the user wishes to view the information associated with data sources for a particular site of interest. The user specifies a site of interest by selecting a site from a list of sites (802). The user may then request that the system retrieve information associated with data sources for the site of interest by selecting a command button (808). The information associated with the data sources associated with the site of interest is then presented in the results of a table (814) specifying the abstract stream(s) (812) and abstract role(s) (810) of each data source. For example, the "ArcGIS"™ data source is designated with a "spatial" abstract stream and designated with both an "operation area/working environment" abstract role and a "corporate data" abstract role. The abstract stream(s) (812) are depicted as row headers of the table (814). The abstract role(s) (810) are depicted as column headers of the table (814). ARCGIS™ is a trademark of Environmental Systems Research Institute, Inc. located in Redlands, Calif.

Next, the user may choose to filter the information presented in the results of the table (814). For example, the user may select to view only information associated with data sources designated with abstract roles (i.e., roles) in the "Only Managed" group by selecting "Only Managed" from the list of abstract roles (804). Further, the user may select to view only information associated with data sources designated with a particular abstract stream (i.e., data stream) or group of abstract streams by making a selection from the list of abstract streams (806). After the user makes his filter selections, the user may then request that the system retrieve information associated with data sources for the site of interest further restricted by the selected filters. For example, the abstract roles (810) in FIG. 8 are restricted to "Only Managed" abstract roles.

Figure 9:
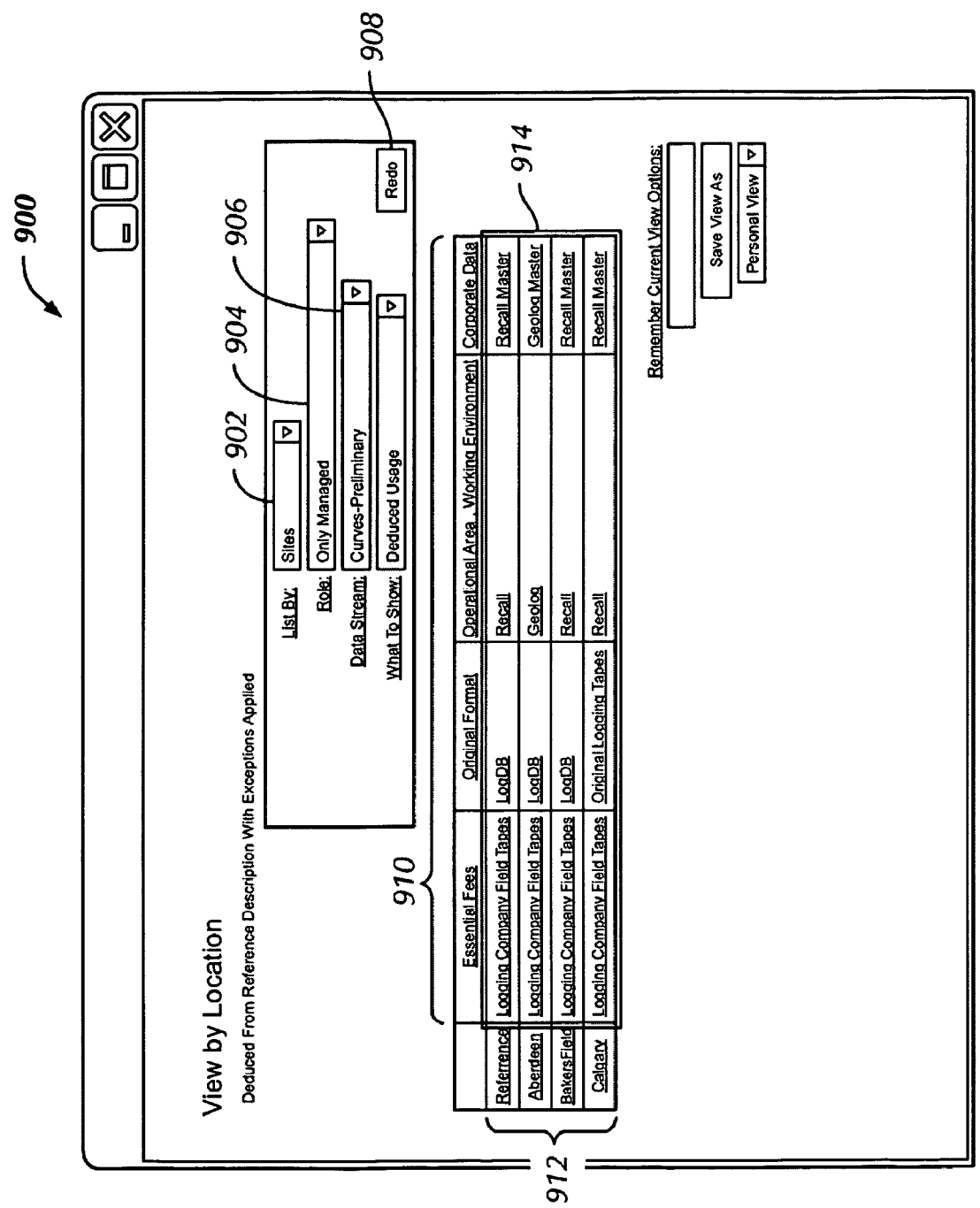

FIG. 9 depicts a graphical user interface (GUI) in accordance with one embodiment of the invention. The following is an example of the process described in FIG. 7 above using FIG. 9. The example should not be construed to limit the scope of the invention.

Consider the scenario in which information associated with data sources has been collected at a number of sites, and the user wishes to view the information associated with data sources for a particular abstract stream of interest. The user specifies an abstract stream (i.e., data stream) of interest by selecting from a list of abstract streams (906). The user may then request that the system retrieve information associated with data sources designated with the abstract stream of interest by selecting a command button (908). The information associated with the data sources designated with the abstract stream of interest is then presented in the results of a table (914) specifying the site(s) (912) and abstract role(s) (910) of each data source. For example, a "LogDB" data source is associated with a "Reference" site, an "Aberdeen" site, and a "Bakersfield" site and is designated with an "original format" abstract role. The abstract role(s) (910) are depicted as column headers of the table (914).

Next, the user may choose to filter the information presented in the results of the table (914). For example, the user may select to view only information associated with data sources designated with one of the abstract roles in the "Only Managed" group by selecting "Only Managed" from the list of abstract roles (904). After the user makes his filter selections, the user may then request that the system retrieve information associated with data sources for the abstract stream of interest further restricted by the filters. For example, the abstract roles (910) in FIG. 9 are restricted to "Only Managed" abstract roles.

At this stage, the user may compare the abstract roles for the selected abstract stream (906) across a number of sites (912). More specifically, the user may identify differences between the data sources of a particular site and the reference site using the table (914). Based on the differences, the user may generate a proactive action plan for decreasing the differences between the information management of the reference site and the particular site. In one example, the differences between the particular site and the reference site may be graphically represented on the GUI.

In one or more embodiments of the invention, the GUI is a stand alone interface operating in a runtime environment. In another embodiment of the invention, the GUI is integrated into a web browser (e.g., Hypertext Markup Language (HTML) pages, server pages, Asynchronous JavaScript and XML (AJAX) pages, or some other web-based GUI).

The following is an example of the interactions between data sources monitored by an information management system. The example should not be construed to limit the scope of the invention.

Initially, pressure data is be obtained at sensors of an oilfield as described with respect to FIGS. 1A-1D. Specifically, the pressure data is collected using a sensor in a drilling tool and then stored in a data file at the surface unit. In this example, the data file stored at the surface unit is a raw data source. Further, the abstract stream of the pressure data is drilling, and the abstract role of the pressure data is original.

Next, the pressure data may be transferred from the surface unit to a mapping specialist for processing. More specifically, the mapping specialist may use a mapping application to link the pressure data to geographic information (e.g., location of the oilfield, distance to nearest adjacent oilfield, etc.) to obtain processed pressure data. In this case, the mapping specialist may receive pressure data from a number of oilfields, where each of the oilfields is a separate raw data source as described above. The processed pressure data may be stored in any suitable data repository, which is an intermediate data source in this example. Further, the abstract stream of the processed pressure data is drilling and spatial (i.e., geographic), and the abstract role of the processed pressure data is working.

Next, the mapping specialist uploads the processed pressure data to an approval database. In this case, a number of mapping specialists are processing pressure data to be moved to the approval database that includes pressure data for all the oilfields of a company. The approval database is also an intermediate data source. Further, the abstract stream of the consolidated pressure data is drilling and spatial (i.e., geographic), and the abstract role of the consolidated pressure data is master.

Next, a chief reservoir engineer reviews the consolidated pressure data. Once the consolidated pressure data is approved by the chief reservoir engineer, the consolidated pressure data is moved to a data repository of an enterprise drilling application. The enterprise drilling application provides the approved pressure data for use in future drilling operations. In this case, the data repository of the enterprise drilling application is a destination data source. Further, the abstract stream of the approved pressure data is drilling and spatial (i.e., geographic), and the abstract role of the approved pressure data is project.

In this example, each of the data sources may be classified using the information management system as discussed with respect to FIGS. 2-3. Further, the flow of data between the data sources may be defined, describing how pressure data originating at the raw data source is processed to obtain destination data in the destination data source. A user of the information management system may track the flow of pressure data throughout the company. More specifically, the user may consult the information management system to obtain information regarding the source of the pressure data as well as the parties that are involved in the processing of the pressure data. Further, the user may compare the difference between the flows of pressure data from specific oilfields. For example, each oilfield may use a different type of raw data source of capturing the pressure data.

Figure 10:
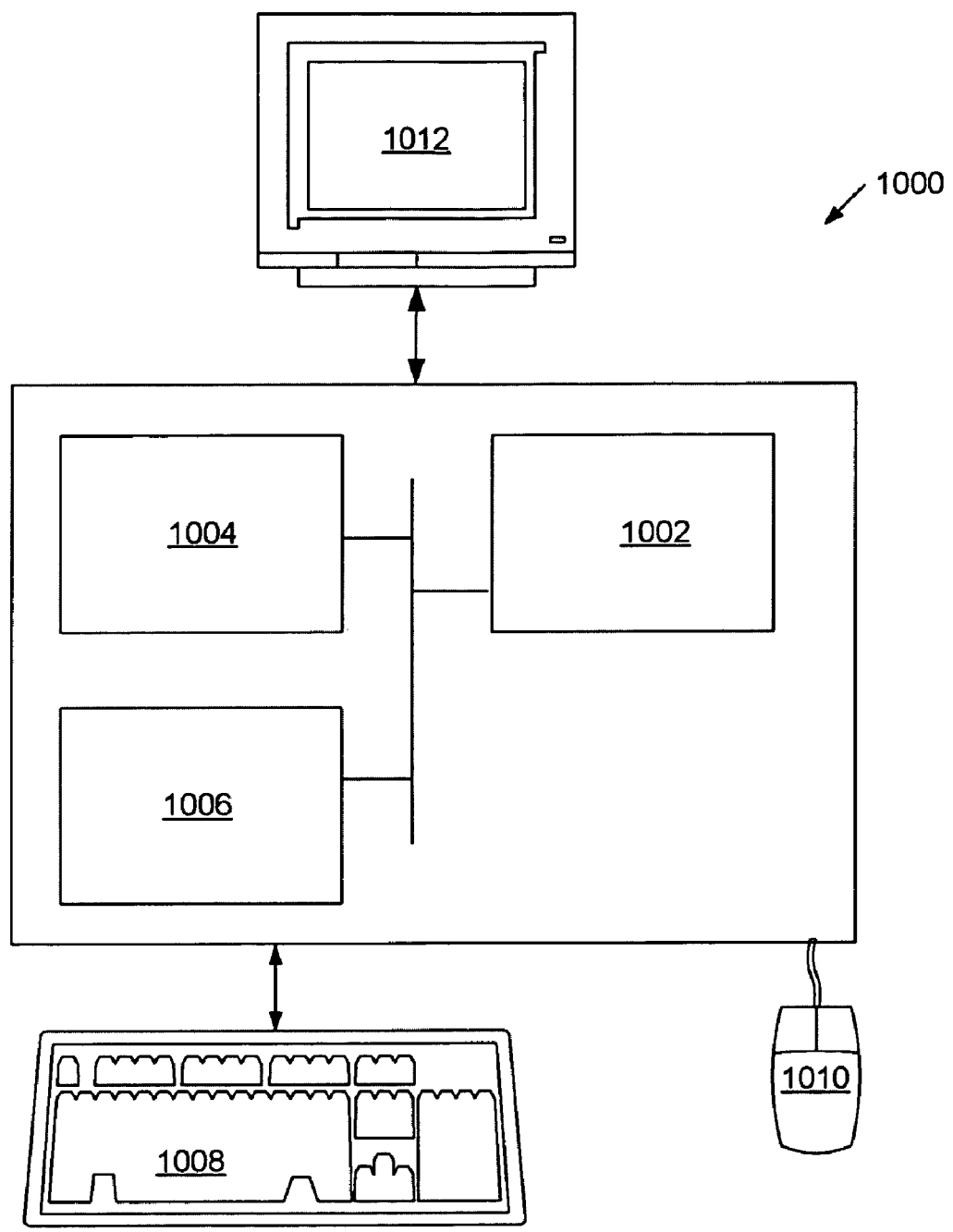
FIG. 10 depicts a computer system in accordance with on or more embodiments of the invention.

The invention may be implemented on virtually any type of computer regardless of the platform being used. For example, as shown in FIG. 10, a networked computer system (1000) includes a processor (1002), associated memory (1004), a storage device (1006), and numerous other elements and functionalities typical of today's computers (not shown). The networked computer (1000) may also include input means, such as a keyboard (1008) and a mouse (1010), and output means, such as a monitor (1012). The networked computer system (1000) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (1000) may be located at a remote location and connected to the other elements over a network.

Further, those skilled in the art will appreciate that one or more elements of the aforementioned computer system (1000) may be located at a remote location and connected to the other elements over a network. Further, the invention may be implemented on a distributed system having a plurality of nodes, where each portion of the invention (e.g., data compiler and visualizer, IMS data source, IMS data access system, etc.) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing information associated with an oilfield operation of an oilfield, the oilfield having a subterranean formation with geological structures and reservoirs therein, comprising:
    specifying a first site of interest, wherein a first data source comprises data stored at the first site of interest;
    designating a first abstract role for the first data source, wherein the first abstract role corresponds to one of a plurality of information lifecycle roles;
    designating a first abstract stream for the first data source, wherein the first abstract stream corresponds to one of a plurality of categories of information;
    generating a first output associated with the first data source, wherein the first output comprises the first site of interest, the first abstract role, and the first abstract stream; and
    presenting the first output, wherein the oilfield operation is adjusted based on the first output.

2. The method of claim 1, further comprising:
    designating a first workflow for the first data source, wherein the workflow describes how data within the first data source transitions from a first one of the plurality of abstract roles to a second one of the plurality of abstract roles,
    wherein the first output further comprises the first workflow.

3. The method of claim 1, further comprising:
    specifying a second site of interest, wherein a second data source comprises data stored at the second site of interest;
    designating the first abstract role for the second data source;
    designating a second abstract stream for the second data source, wherein the abstract stream corresponds to one of the plurality of categories of information;
    generating a second output associated with the second data source, wherein the second output comprises, the second site of interest, the first abstract role and the second abstract stream; and
    presenting the second output.

4. The method of claim 3, further comprising:
    specifying an abstract role of interest, wherein the abstract role of interest is the first abstract role; and
    generating a third output comprising a fourth output and a fifth output;
    wherein the fourth output is associated with the first data source and comprises a reference to the first site of interest, the first abstract role, and the first abstract stream;
    wherein the fifth output is associated with the second data source and comprises a reference to the second site of interest, the first abstract role, and the second abstract stream.

5. The method of claim 4, wherein the first data source is organized in accordance with a first data schema and the second data source is organized in accordance with a second data schema.

6. The method of claim 4, wherein the third output is presented in a three-dimensional format.

7. The method of claim 1, further comprising:
    designating a second abstract role for the first data source;
    designating a second abstract stream for the first data source;
    generating a second output associated with the first data source, wherein the second output comprises, the first site of interest, the second abstract role and the second abstract stream; and
    presenting the second output.

8. The method of claim 1, wherein the first data source comprises oil exploration data stored at the first site.

9. The method of claim 1, wherein the first data source is a raw data source, wherein a raw data source is an instrument for collecting data.

10. The method of claim 1, wherein each of the plurality of categories of information corresponds to one selected from a group consisting of: spatial, seismic, wells, logs, drilling, production, unstructured, and field.

11. The method of claim 10, wherein at least one of the plurality of categories of information comprises a plurality of subcategories and wherein the first data source is designated using one of the plurality of subcategories.

12. The method of claim 1, wherein each of the plurality of information lifecycle roles is one selected from a group consisting of: external feed, original, working, master, project, and target.

13. A system for managing information associated with an oilfield operation of an oilfield, the oilfield having a subterranean formation with geological structures and reservoirs therein, comprising:
    an information management data source configured to store information associated with a first data source, wherein the first data source comprises data stored at a first site of interest;
    a hierarchical data provider configured to retrieve the information associated with the first data source from the information management data source;
    an abstract role manager configured to designate at least one of a plurality of abstract roles to the data associated with the first data source, wherein each of the plurality of abstract roles corresponds to one of a plurality of information lifecycle roles;
    an abstract stream manager configured to designate at least one of the plurality of abstract streams to the data associated with the first data source, wherein each of the plurality of abstract streams corresponds to one of a plurality of categories of information;

a data compiler and visualizer configured to generate a first output comprising data from the first data source associated with at least one of the plurality of abstract roles and at least one of the plurality of abstract streams; and an interface configured to present the first output, wherein the oilfield operation is adjusted based on the first output.

14. The system of claim 13, further comprising:
a workflow manager configured to designate a first workflow for the first data source, wherein the workflow describes data within the first data source transitions from a first one of the plurality of abstract roles to a second one of the plurality of abstract roles, wherein the first output further comprises the first workflow.

15. The system of claim 13, wherein:
the information management data source is further configured to store information associated with a second data source, wherein the second data source comprises data stored at a second site of interest;
the abstract role manager is further configured to designate the first abstract role for the second data source;
the abstract stream manager is further configured to designate a second abstract stream for the second data source, wherein the abstract stream corresponds to one of the plurality of categories of information;
the data compiler and visualizer is further configured to generate a second output associated with the second data source, wherein the second output comprises, the second site of interest, the first abstract role and the second abstract stream; and
the interface is further configured to present the second output.

16. The system of claim 15, the computer program code further comprising program instructions to, wherein:
the data compiler and visualizer are further configured to:
specify an abstract role of interest, wherein the abstract role of interest is the first abstract role; and
generate a third output comprising a fourth output and a fifth output,
wherein the fourth output is associated with the first data source and comprises a reference to the first site of interest, the first abstract role, and the first abstract stream;
wherein the fifth output is associated with the second data source and comprises a reference to the second site of interest, the first abstract role, and the second abstract stream.

17. The system of claim 16, wherein the first data source is organized in accordance with a first data schema and the second data source is organized in accordance with a second data schema.

18. The system of claim 13, wherein:
the abstract role manager is further configured to designate a second abstract role for the first data source;
the abstract stream manager is further configured to designate a second abstract stream for the first data source;
the data compiler and visualizer is further configured to generate a second output associated with the first data source, wherein the second output comprises, the first site of interest, the second abstract role and the second abstract stream; and the interface is further configured to present the second output.

19. The system of claim 13, wherein the first data source comprises oil exploration data stored at the first site.

20. The system of claim 13, wherein each of the plurality of categories of information corresponds to one selected from a group consisting of: spatial, seismic, wells, logs, drilling, production, unstructured, and field.

21. The system of claim 20, wherein at least one of the plurality of categories of information comprises a plurality of subcategories and wherein the first data source is designated using one of the plurality of subcategories.

22. The system of claim 13, wherein each of the plurality of information lifecycle roles is one selected from a group consisting of: external feed, original, working, master, project, and target.

23. The system of claim 13, wherein the first output is used to analyze the data in the first data source.

24. A system for managing information associated with an oilfield operation of an oilfield, the oilfield having a subterranean formation with geological structures and reservoirs therein, comprising:
a first data source comprising data stored at a first site, wherein the first data source is associated with a first abstract role and a first abstract stream;
a second data source comprising data stored at the first site, wherein the second data source is associated with the first abstract role and a second abstract stream;
a third data source comprising data stored at a second site, wherein the third data source is associated with a second abstract role and the first abstract stream; and
an interface configured to:
enable a user to specify selection information, wherein the selection information comprises at least one of the first abstract role, the second abstract role, the first abstract stream, and the second abstract stream; and
present output describing data from the first data source, the second data source, and the third data source associated with the selection information, wherein the oilfield operation is adjusted based on the output.

25. A computer readable medium comprising computer program code embodied therein for causing a computer system to manage information associated with an oilfield operation of an oilfield, the oilfield having a subterranean formation with geological structures and reservoirs therein, the computer program code comprising program instructions to:
specify a first site of interest, wherein a first data source comprises data stored at the first site of interest;
designate a first abstract role for the first data source, wherein the first abstract role corresponds to one of a plurality of information lifecycle roles;
designate a first abstract stream for the first data source, wherein the abstract stream corresponds to one of a plurality of categories of information;
generate a first output associated with the first data source, wherein the first output comprises the first site of interest, the first abstract role, and the first abstract stream; and
present the first output, wherein the oilfield operation is adjusted based on the first output.

\* \* \* \* \*